2,863,871
Patented Dec. 9, 1958

2,863,871
PROCESS FOR THE MANUFACTURE OF VAT DYESTUFFS

Francis Irving and Alistair Livingston, Manchester, England, assignors to Imperial Chemical Industries Limited, London, England, a corporation of Great Britain No Drawing. Application February 25, 1957
Serial No. 641,846

Claims priority, application Great Britain March 7, 1956

10 Claims. (Cl. 260—274)

This invention relates to an improved process for the manufacture of vat dyestuffs and more particularly to an improved process for the manufacture of vat dyestuffs of the benzanthroneanthraquinoneacridine series.

The numbering of the benzanthroneanthraquinoneacridine compounds used in this specification is that given for the parent ring system in "The Ring Index," 1940, by Patterson and Capell, published by the Reinhold Publishing Corporation, page 571, No. 3,888.

In United Kingdom specification No. 337,741 there is disclosed a process for treating anthraquinonyl-aminobenzanthrones which contain several anthraquinonylamino radicles and of which one is in the Bz1-position with alkaline condensing agents, the products thus obtained being treated with acid condensing agents if desired, for example sulphuric acid or aluminium chloride. In the said United Kingdom specification there is described the treatment of di(1'-anthraquinonyl)-6. Bz1-diaminobenzanthrone with a mixture of caustic potash and alcohol as an alkaline condensing agent to give an olive brown vat dyestuff. The said specification also discloses that treatment of the product so obtained (hereinafter named 3-α-anthraquinonylaminobenzanthroneanthraquinoneacridine) with concentrated sulphuric acid as an acid condensing agent, yields a green vat dyestuff.

It has been found that the said green vat dyestuff has a defect in that fabrics dyed therewith have very poor fastness to soda boiling inasmuch as there is a marked change of shade and adjacent undyed fabric is heavily stained. When 3-α-anthraquinonylaminobenzanthroneanthraquinoneacridine is treated with a mixture of aluminium chloride and sodium chloride at a temperature of about 150° C. it has been found that the vat dyestuff obtained dyes in unattractive green-grey shades.

The surprising and most valuable discovery has now been made, however, that when 3-α-anthraquinonylamino-benzanthroneanthraquinoneacridine is treated with aluminium chloride at elevated temperatures in the presence of an oxidising agent, there is obtained a greenish-khaki vat dyestuff which dyes fabrics in shades having exceptionally good fastness to soda boiling.

According to the invention, therefore, there is provided a process for the manufacture of a vat dyestuff which comprises heating 3-α-anthraquinonylamino-benzanthroneanthraquinoneacridine with aluminium chloride at an elevated temperature in the presence of an oxidising agent.

By elevated temperature is meant a temperature of not less than 100° C. and not more than 200° C., but it is preferred to use a temperature between 125° C. and 155° C.

As examples of oxidising agents which may be used in the above process there may be mentioned oxygen, manganese dioxide, sodium nitrate, nitrobenzene, m-dinitrobenzene and m-nitrobenzene sulphonic acid.

Of these, the preferred oxidising agents are aromatic nitro compounds especially nitrobenzene and its derivatives. In particular it is preferred to use sodium m-nitrobenzene sulphonate which is water-soluble itself and is converted to a water-soluble product during the reaction, thus being readily removed from the mixture whilst isolating the product.

When the anthraquinonylamino-benzanthroneanthraquinoneacridine is first treated with aluminium chloride and the oxidising agent added subsequently, the product obtained is very similar to that obtained in the absence of oxidising agent, namely a dyestuff giving a dull greenish grey shade. Accordingly, it is essential that the oxidising agent be added simultaneously with, or preferably before the anthraquinonylamino-benzanthroneanthraquinoneacridine.

A slight variation in shade can be obtained by varying the amount of oxidising agent, but the time of reaction has less effect upon the final shade. When sodium m-nitrobenzene sulphonate is used as oxidising agent, about ⅛ of the weight of the anthraquinonylamino-benzanthroneanthraquinoneacridine is the minimum which should be used. However little shade change is observed once the weight of the sodium m-nitrobenzene sulphonate used is one-half or greater than one-half the weight of the anthraquinonylamino-benzanthroneanthraquinoneacridine.

It is preferred to carry out the process of the invention in the presence of one or more salts known to form low-melting mixtures with aluminium chloride, thereby enabling the reaction to be carried out in a liquid medium at the preferred temperatures. As examples of suitable salts there may be mentioned alkali and alkaline earth metal halides, for example sodium chloride, potassium chloride and calcium chloride.

The dyestuff obtained by the process of the invention dyes cellulosic material from an olive-green vat in greenish-khaki shades of outstanding fastness to wet treatments, especially soda-boiling. It possesses high stability to heating in the vat at temperatures above 85° C. and is thus especially valuable for recently developed methods of continuous dyeing necessitating heating of the vat liquors at temperatures above 85° C. for long periods of time, for example, for dyeing in the machine which is described in United Kingdom specification No. 620,584.

The invention is illustrated but not limited by the following examples, in which parts are by weight:

Example 1

30 parts of 3-α-anthraquinonylamino-benzanthroneanthraquinoneacridine are slowly introduced into a mixture of 270 parts of aluminium chloride, 10 parts of sodium m-nitrobenzenesulphonate and 41 parts of sodium chloride at 120° C. The temperature is then slowly raised to 130° C. and maintained between 130° C. and 140° C. for 5 hours. The reaction mixture is poured into water and dilute hydrochloric acid, the suspension is boiled and the precipitate filtered off and washed with water. The dyestuff so obtained dissolves in concentrated sulphuric acid to give a very dull greenish-blue solution and dyes cotton greenish-khaki from an olive green vat.

Example 2

The process described in Example 1 is repeated, using 20 parts, instead of 10 parts, of sodium m-nitrobenzene sulphonate, and heating for only 3 hours at a temperature between 130° C. and 140° C.

The dyestuff obtained dyes cotton in a shade slightly brighter and greener than that obtained from the dyestuff of Example 1.

Example 3

A mixture of 270 parts of aluminium chloride and 41 parts of sodium chloride is stirred at about 130° C. and a stream of oxygen is bubbled through the molten mixture for 30 minutes.

30 parts of 3-α-anthraquinonylaminobenzanthroneanthraquinoneacridine are then added to the mixture at such a rate that the temperature does not exceed 140° C. The mixture is then stirred at 140° C. for 3 hours after the addition is complete, the flow of oxygen being maintained during the addition and the subsequent heating period.

The dyestuff is then isolated as described in Example 1. It dyes cotton in a shade similar to that obtained from the dyestuff of Example 2.

*Example 4*

30 parts of 3-α-anthraquinonylaminobenzanthroneanthraquinoneacridine are introduced into a molten mixture of 270 parts of aluminium chloride, 10 parts of m-dinitrobenzene and 41 parts of sodium chloride so that the temperature does not rise above 150° C. The reaction mixture is stirred at a temperature between 140° C. and 150° C. for 5 hours and then the dyestuff is isolated as described in Example 1. It dyes cotton in a shade similar to that obtained from the product obtained as described in Example 2.

*Example 5*

30 parts of 3-α-anthraquinonylaminobenzanthroneanthraquinoneacridine are introduced into a molten mixture of 270 parts of aluminium chloride, 41 parts of sodium chloride and 20 parts of nitrobenzene so that the temperature does not rise above 170° C. The reaction mixture is stirred at 150° C. for 3 hours and then the dyestuff is isolated as described in Example 1. It dyes cotton in a shade similar to that obtained from the product obtained as described in Example 2.

What we claim is:

1. A process for the manufacture of a vat dyestuff which comprises admixing 3-α-anthraquinonylaminobenzanthroneanthraquinoneacridine and an oxidizing agent with aluminium chloride and heating the resulting mixture at a temperature between 100° and 200° C., the oxidizing agent being admixed with the aluminium chloride at least no later than the 3-α-anthraquinonylamino-benzanthroneanthraquinoneacridine.

2. Process as claimed in claim 1 wherein said mixture includes at least one salt which forms a low melting mixture with aluminium chloride.

3. Process as claimed in claim 1 wherein the reaction is carried out at a temperature of not less than 125° C. and not greater than 155° C.

4. Process as claimed in claim 1 wherein the oxidising agent is mixed with the aluminium chloride before the 3 - α - anthraquinonylamino-benzanthroneanthraquinoneacridine.

5. Process as claimed in claim 1 wherein the oxidising agent used is a nitrobenzene.

6. Process as claimed in claim 5 wherein the oxidising agent used is sodium m-nitrobenzene sulphonate.

7. Process as claimed in claim 6 wherein the weight of sodium m-nitrobenzene sulphonate used is at least one-half the weight of 3-α-anthraquinonylamino-benzanthroneanthraquinoneacridine added.

8. Process as claimed in claim 1 wherein the oxidizing agent and 3-α-anthraquinonyl-amino-benzanthroneanthraquinoneacridine are mixed with the aluminium chloride simultaneously.

9. Process as claimed in claim 1 wherein said oxidizing agent is selected from the group consisting of oxygen, manganese dioxide, sodium nitrate, nitrobenzene, m-dinitrobenzene and m-nitrobenzene sulphonic acid.

10. The vat dyestuff obtained by the process of claim 1.

References Cited in the file of this patent

FOREIGN PATENTS

| | | |
|---|---|---|
| 472,325 | Great Britain | Sept. 22, 1937 |
| 678,522 | Great Britain | Sept. 3, 1952 |

OTHER REFERENCES

Venkataraman: "Synthetic Dyes," vol. II, page 901, Academic Press Inc., 1952.